(12) United States Patent
Janousek

(10) Patent No.: US 9,289,819 B2
(45) Date of Patent: Mar. 22, 2016

(54) INTEGRAL PUSH FITTING AND VALVE WITH INTEGRAL PUSH FITTING AND METHOD OF MANUFACTURING SAME

(71) Applicant: James A. Janousek, Simi Valley, CA (US)

(72) Inventor: James A. Janousek, Simi Valley, CA (US)

( * ) Notice: Subject to any disclaimer, the term of this patent is extended or adjusted under 35 U.S.C. 154(b) by 0 days.

(21) Appl. No.: 14/697,445

(22) Filed: Apr. 27, 2015

(65) Prior Publication Data

US 2015/0239036 A1    Aug. 27, 2015

Related U.S. Application Data

(62) Division of application No. 13/731,713, filed on Dec. 31, 2012, now Pat. No. 9,052,023.

(51) Int. Cl.
| | |
|---|---|
| *F16K 13/00* | (2006.01) |
| *B21K 1/24* | (2006.01) |
| *F16K 27/02* | (2006.01) |
| *F16L 37/091* | (2006.01) |

(52) U.S. Cl.
CPC . *B21K 1/24* (2013.01); *F16K 13/00* (2013.01); *F16K 27/029* (2013.01); *F16L 37/091* (2013.01); *Y10T 29/49405* (2015.01); *Y10T 29/49826* (2015.01); *Y10T 137/6065* (2015.04)

(58) Field of Classification Search
CPC ........ B21K 1/24; F16L 37/091; F16L 27/029; F16L 13/00; Y10T 29/49826; Y10T 137/6065; Y10T 29/49405
USPC ............... 137/15.18, 315.27; 251/149–149.1; 285/382
See application file for complete search history.

(56) References Cited

U.S. PATENT DOCUMENTS

| | | | |
|---|---|---|---|
| 3,820,826 A | 6/1974 | Ligon et al. | |
| 3,924,882 A | 12/1975 | Ellis | |
| 4,988,077 A * | 1/1991 | Conley .................. | F16K 27/065 251/366 |
| 5,487,572 A | 1/1996 | Combot-Courrau et al. | |
| 5,799,986 A | 9/1998 | Corbett et al. | |
| 6,220,275 B1 * | 4/2001 | Nishinosono ....... | F16K 31/0606 137/238 |
| 6,408,885 B2 | 6/2002 | Hillis | |
| 6,450,550 B1 | 9/2002 | Cornwell | |
| 7,686,346 B1 | 3/2010 | Buccicone et al. | |
| 7,862,089 B2 | 1/2011 | Crompton | |

(Continued)

FOREIGN PATENT DOCUMENTS

WO    2009/024787 A1    2/2009

OTHER PUBLICATIONS

John Guest Data Sheet, Inch- and Metric-Size Metal and Plastic Half Cartridges, date unknown (applicants states this is prior art), 2 pages.

(Continued)

*Primary Examiner* — John Bastianelli
(74) *Attorney, Agent, or Firm* — Lathrop & Gage LLP

(57) ABSTRACT

A push fitting for a valve includes a body having a longitudinal axis along which a fluid can flow, the body defining an opening at a first end of the body. A push fitting assembly at the first end of the body includes a housing. The housing includes a first end which is integrally formed within a wall of the opening at the first end of the body and a crimpable second end which extends longitudinally beyond the first end of the body. The housing also includes a crimpable material such that the second end of the housing is crimpable to capture elements of the push fitting assembly at the first end of the body.

22 Claims, 5 Drawing Sheets

(56) References Cited

U.S. PATENT DOCUMENTS

| | | |
|---|---|---|
| 7,942,161 B2 | 5/2011 | Crompton |
| 2008/0149873 A1 | 6/2008 | Cimberio et al. |
| 2011/0140417 A1 | 6/2011 | Kluss et al. |
| 2012/0169039 A1 | 7/2012 | Crompton et al. |

OTHER PUBLICATIONS

PCT/US2013/078246 International Search Report & Written Opinion mailed Apr. 24, 2014, 6 pages.

* cited by examiner

INTEGRAL PUSH FITTING AND VALVE WITH INTEGRAL PUSH FITTING AND METHOD OF MANUFACTURING SAME

RELATED APPLICATIONS

This application is a divisional of U.S. patent application Ser. No. 12/731,713, titled "Integral Push Fitting and Valve with Integral Push Fitting and Method of Manufacturing the Same", filed on Dec. 31, 2012 and which is incorporated by reference herein.

BACKGROUND

1. Technical Field

This disclosure relates to fittings and devices with fittings such as valves and, more particularly, to push fittings or push-to-connect fittings, and devices such as valves with push fittings and methods of manufacturing push fittings and devices such as valves with push fittings.

2. Discussion of the Related Art

Some valves or other devices for fluid flow include push fittings or push-to-connect fittings. With push fittings, to connect a pipe or tube to the device, the pipe or tube is pushed into the push fitting, which is disposed within an opening in the device body. Typically, the device body can be made of some form of molded plastic. The push fitting is assembled into the device body and can typically include a set of gripping teeth or fingers for gripping the outer surface of a pipe or tube when it is inserted into the opening in the valve body. The pipe or tube can typically be formed of a metal such as copper or a plastic such as polyvinyl chloride (PVC). The push fitting is also typically assembled with an O-ring to seal the pipe or tube within the opening in the device body.

SUMMARY

According to one aspect, a push fitting is provided. The push fitting includes a body having a longitudinal axis along which a fluid can flow, the body defining an opening at a first end of the body. A push fitting assembly at the first end of the body includes a housing, the housing comprising a first end which is integrally formed within a wall of the opening at the first end of the body and a crimpable second end which extends longitudinally beyond the first end of the body. The housing includes a crimpable material such that the second end of the housing is crimpable to capture elements of the push fitting assembly at the first end of the body.

According to another aspect, a valve is provided. The valve includes a valve body having a longitudinal axis along which a fluid can flow, the valve body defining an opening at a first end of the valve body. A push fitting assembly at the first end of the valve body includes a housing comprising a first end which is integrally formed within a wall of the opening at the first end of the valve body and a crimpable second end which extends longitudinally beyond the first end of the valve body. The housing includes a crimpable material such that the second end of the housing is crimpable to capture elements of the push fitting assembly at the first end of the valve body.

According to another aspect, a method of making a push fitting is provided. According to the method, a body having a longitudinal axis along which a fluid can flow is formed. The body defines an opening at a first end of the body. Forming the body includes forming a first end of a housing integrally within a wall of the opening at the first end of the body. Elements of a push fitting assembly are installed inside the housing.

According to another aspect, a method of making a valve is provided. According to the method, a valve body having a longitudinal axis along which a fluid can flow is formed. The valve body defines an opening at a first end of the valve body. Forming the valve body includes forming a first end of a housing integrally within a wall of the opening at the first end of the valve body. Elements of a push fitting assembly are installed inside the housing.

BRIEF DESCRIPTION OF THE DRAWINGS

The foregoing and other features and advantages will be apparent from the more particular description of preferred embodiments, as illustrated in the accompanying drawings, in which like reference characters refer to the same parts throughout the different views. The drawings are not necessarily to scale, emphasis instead being placed upon illustrating the principles of the preferred embodiments. In the drawings, the sizes and thicknesses of layers, regions and features may be exaggerated for clarity.

DETAILED DESCRIPTION

Figure 1:
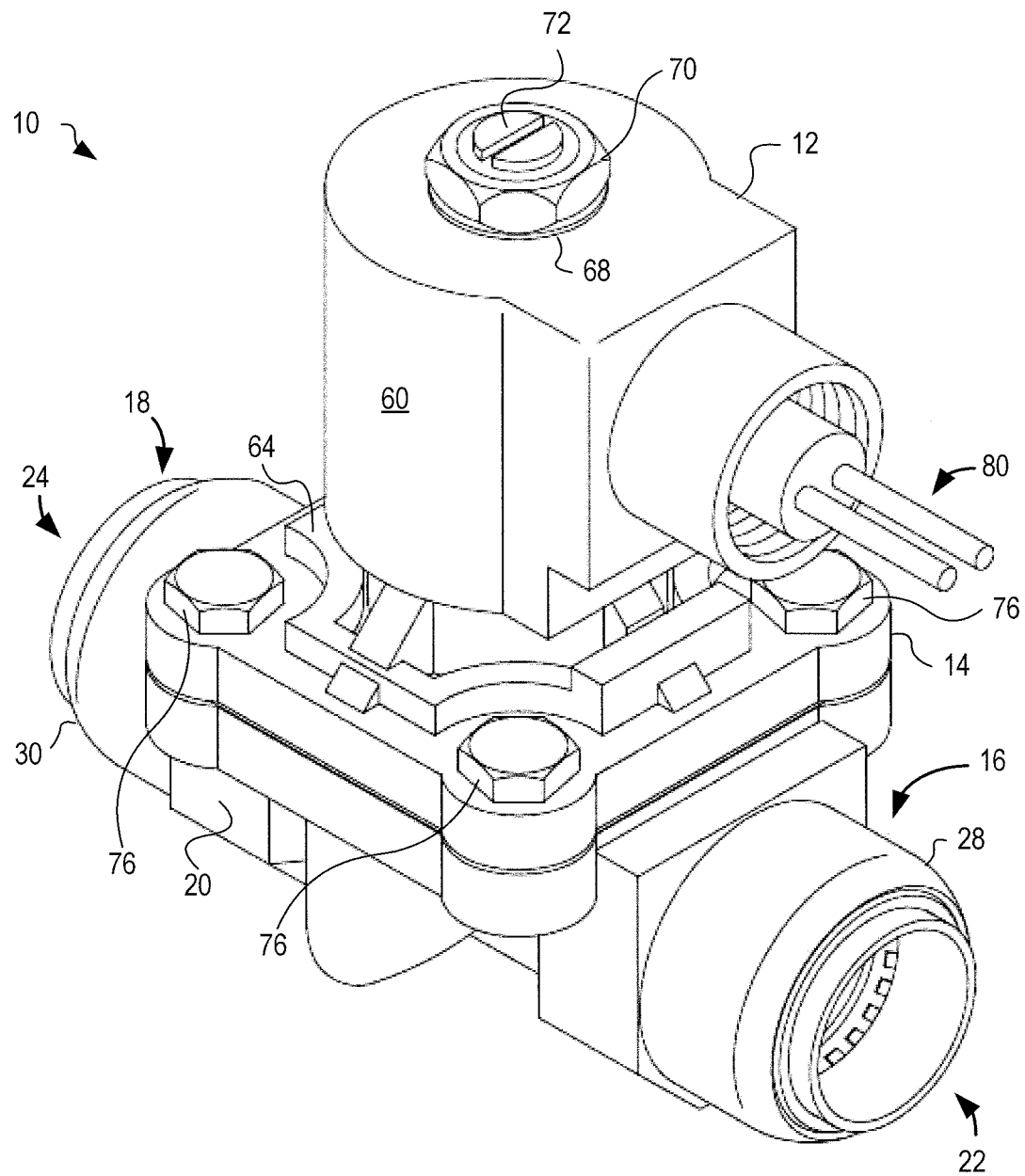
FIG. 1 includes a schematic perspective view of a solenoid valve which includes two push fittings, according to some exemplary embodiments.

FIG. 1 includes a schematic perspective view of a solenoid valve which includes two push fittings, according to some exemplary embodiments. It will be noted that the present disclosure is directed to a push fitting in the context of a valve, specifically a solenoid valve. However, it will be understood that the present disclosure is applicable to any type of device that uses fittings, and, specifically, push fittings. These other such devices to which the present disclosure is applicable include any device with a plastic housing or body able to be connected into a fluid flow circuit, including, but not limited to, filters, regulators, lubricators, and the like.

Referring to FIG. 1, the solenoid valve 10 includes a solenoid 12 coupled to a valve 14. Solenoid 12 controls opening and closing of valve 14. Valve 14 includes an input end 16 into which a fluid such as water or air can flow and an output end 18 out of which the fluid can flow. Flow of fluid through valve 14 is controllable by solenoid 12. In a first state of solenoid 12, which is controllable via electrical inputs 20, valve 14 is open such that the fluid can flow through valve 14 from input end 16 to output end 18. In a second state of solenoid 12, valve 14 is closed such that the fluid cannot flow through valve 14.

In some exemplary embodiments, valve 14 includes a valve body 20 in which are formed one or more openings, one at each of input end 16 and output end 18 of valve 14. In some exemplary embodiments, valve body 20 includes an opening 22 at input end 16 and opening 24 at output end 18. According to some exemplary embodiments, a push fitting or push-to-connect fitting 28 is disposed in opening 22 in valve body 20, and another push fitting or push-to-connect fitting 30 is disposed in opening 24 in valve body 20. It should be noted that in the exemplary embodiment illustrated in FIG. 1, valve 10 includes two push fittings 28 and 30 at both ends of valve 10. According to the present disclosure, any number of push fittings can be employed. For example, according to some exemplary embodiments, valve 10 may include only one push fitting disposed in one of openings 22 and 24.

Figure 2:
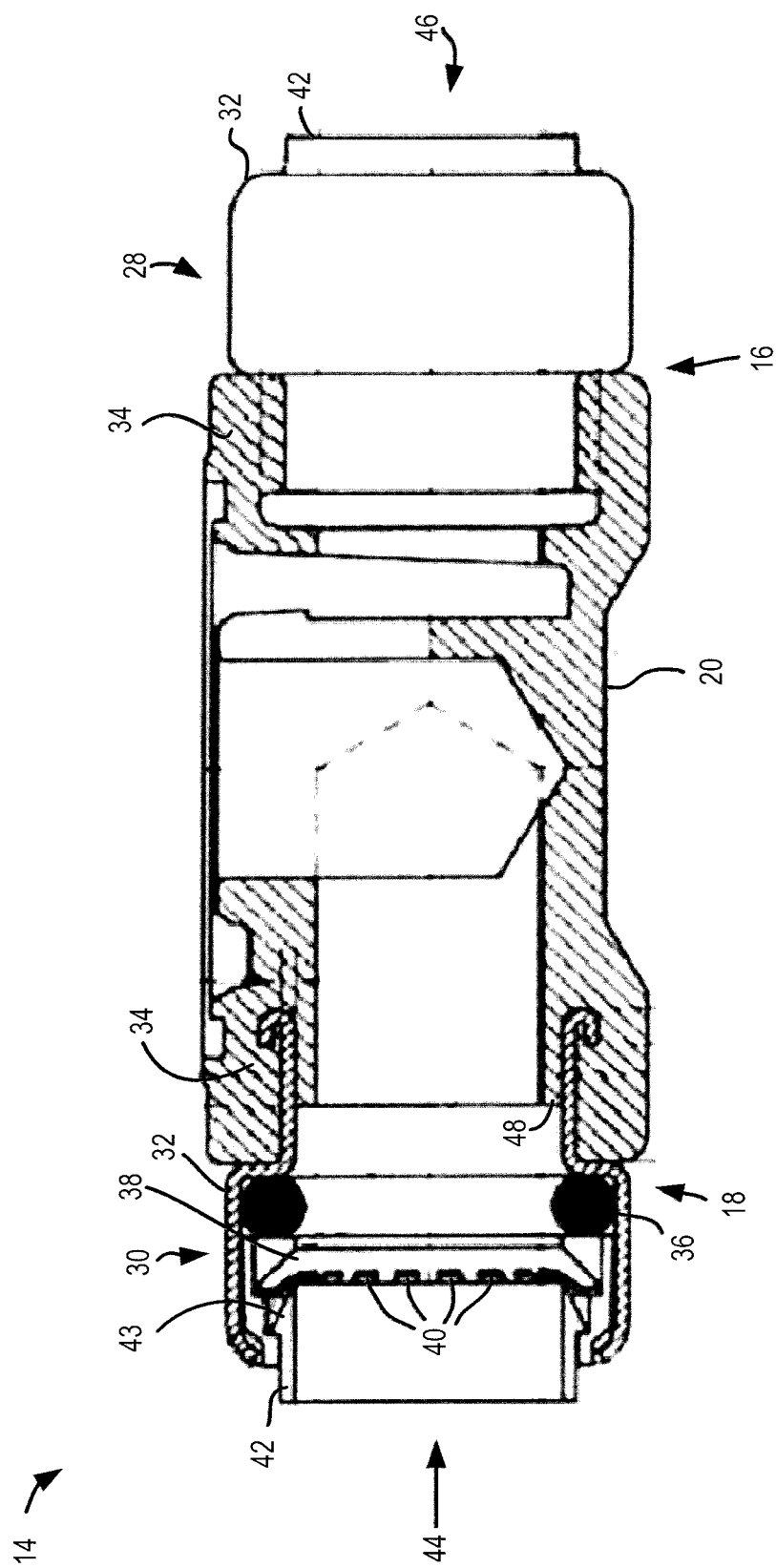
FIG. 2 includes a schematic partial cross-sectional view of a valve portion of a solenoid valve of the type illustrated in FIG. 1, according to some exemplary embodiments.

FIG. 2 includes a schematic partial cross-sectional view of a valve portion of a solenoid valve of the type illustrated in FIG. 1, according to some exemplary embodiments. Referring to FIG. 2, in the interest of clarity, the illustration of FIG. 2 does not include solenoid 12. Valve 14, as described above in connection with FIG. 1, includes valve body 20 having first end 16 and second end 18. In the particular illustrated exemplary embodiment, a first push fitting 28 is disposed at first end 16 of valve body 20, and second push fitting 30 is disposed at second end 18 of valve body 20. As noted above, the present disclosure is applicable to any number of push fittings.

Continuing to refer to FIG. 2, valve body 20 can be made of a molded material, e.g., injection molded material, such as plastic. For example, valve body 20 can be made of injection molded Noryl or nylon. In some exemplary embodiments, each push fitting 28, 30 can include an outer shroud or housing 32, which is integrally formed within the wall 34 of valve body 20. That is, when valve body 20 is molded or injection molded, outer shroud or housing 32 is molded or injection molded within wall 34 of valve body 20. In some exemplary embodiments, outer shroud or housing 32 can be formed of a metallic material. For example, in some exemplary embodiments, outer shroud or housing 32 can be formed of copper and/or an alloy of copper. The material of which outer shroud or housing 32 is made is crimpable, that is, it can be permanently deformed or crimped. In accordance with exemplary embodiments, as described below in additional detail, the free end, i.e., the end that is not integrally formed within wall 34 of valve body 20, is crimpable, or permanently deformable, to capture the elements of the push fitting of the disclosure to assemble the push fitting.

Continuing to refer to FIG. 2, push fitting 30 is shown in cross-section and will be referred to in detail. The description herein with regard to push fitting 30 is applicable to push fitting 28 as well. Push fitting 30 includes an O-ring 36 for forming a seal with a pipe or tube inserted in push fitting 30. O-Ring 36 can be made of any material appropriate for a fluid seal such as, for example, nitrile, silicone, ethylene propylene, fluorocarbon, perfluorinated elastomers, etc. Push fitting 30 also includes a grip ring 38 for gipping the pipe or tube inserted into push fitting 30. To that end, grip ring 30 includes a plurality of grip fingers 40 disposed annularly around the central opening of grip ring 38, through which the pipe or tube passes when connected to push fitting 30. When the pipe or tube is inserted into the central opening of grip ring 38, grip fingers 40 contact the outer surface of the pipe or tube and grip the pipe or tube to hold it within push fitting 30. In some exemplary embodiments, grip ring 38 can be formed of a metallic material, which, in some particular exemplary embodiments, can be stainless steel. Push fitting 30 also includes a collar 42 which also includes a central opening through which the pipe or tube connected to push fitting 30 passes. Collar 42 serves to hold the pipe or tube within push fitting 30 in a stable mating fashion to ensure a straight, sealed, mated junction with push fitting 30.

Connection of the pipe or tube is made to valve 14 via push fittings 28, 30 by pushing the pipe or tube into the opening 46 or 44, respectively, such that grip fingers 40 of grip ring 38 grip the outer surface of the pipe or tube. The pipe or tube is inserted into the opening 44, 46 until it rests against wall or shoulder 48 formed in valve body 20. At that point, O-ring 36 forms a seal with the outer surface of the pipe or tube, and collar 42 holds the pipe or tube in a stable, properly seated and sealed orientation within push fitting 28, 30.

In some exemplary embodiments, push fittings 28, 30 form a permanent connection to the inserted pipe or tube. However, in other exemplary embodiments, the pipe or tube can be removed from push fitting 28, 30, such that the device that includes push fitting 28, 30, e.g., valve 14, can be used again. To that end, collar 42 is slidable along the longitudinal axis of valve 14 such that tapered section 43 of collar 42 engages grip fingers 40 of grip ring 38 to displace them axially out of engagement with the outer surface of the pipe or tube such that the pipe or tube is released from grip ring 38 and can be removed from the push fitting 28, 30.

As described above, a first end of shroud or housing 32 is integrally formed, such as by injection molding, in wall 34 of valve body 20. The second end of shroud or housing 32 extends beyond ends 16, 18 of valve body 20. As shown in FIG. 2, in the completed assembly of push fitting 30, O-ring 36, grip ring 38 and collar 42, are disposed within second end of shroud or housing 32. The second end of shroud or housing 32 is crimped axially as illustrated in FIG. 2 to capture these elements of push fitting 28, 30 and complete the assembly of push fitting 28, 30.

Figure 3:
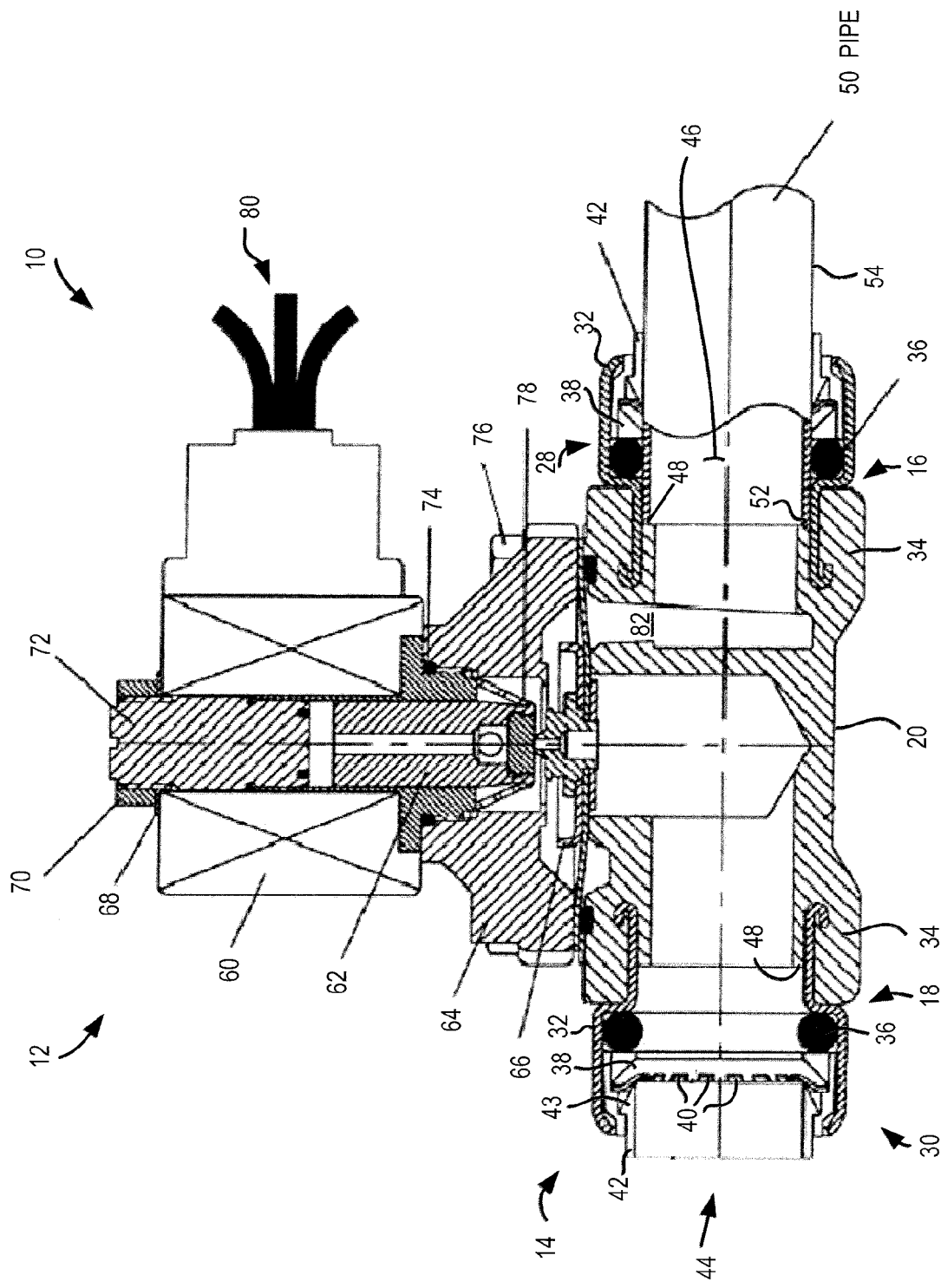
FIG. 3 includes a schematic cross-sectional diagram of a solenoid valve of the type illustrated in FIG. 1, according to some exemplary embodiments.

FIG. 3 includes a schematic cross-sectional diagram of a solenoid valve of the type illustrated in FIG. 1, according to some exemplary embodiments. Referring to FIG. 3, solenoid valve 10 is illustrated with a portion of a pipe or tube 50 inserted into and held within push fitting 28. FIG. 3 includes features of valve 14 illustrated in and described above in connection with FIG. 2. These like features are identified by the same reference numerals as used in FIG. 2. Detailed description of these like features will not be repeated.

Referring to FIG. 3, as noted above, an end portion of pipe or tube 50 is shown captured in or connected to solenoid valve 10. The outer surface 54 of pipe or tube 50 is held stable and straight within opening 46 by collar 42 and is gripped by grip fingers 40 of grip ring 38. Outer surface 54 of pipe or tube 50 also contacts and compresses O-ring 36 to create a fluid-tight seal around pipe or tube 50. The end 52 of pipe or tube 50 seats against wall or shoulder 48 formed in valve body 20.

Continuing to refer to FIG. 3, solenoid valve 10 includes electrical solenoid 12, which electrically controls the opening and closing of solenoid valve 10 to control the flow of fluid through valve 14. As described above, valve 14 includes an input end 16 into which a fluid such as water or air can flow and an output end 18 out of which the fluid can flow. Flow of fluid through valve 14 is controllable by solenoid 12. In a first state of solenoid 12, which is controllable via electrical inputs 80, valve 14 is open such that the fluid can flow through valve 14 from input end 16 to output end 18. In a second state of solenoid 12, valve 14 is closed such that the fluid cannot flow through valve 14.

In some exemplary embodiments, solenoid 12 operates to move a diaphragm assembly 66 up and down between an up or open position in the first state of solenoid 12 in which fluid channels 82 are open to each other and communicate with each other on both sides of valve 14 such that the fluid can flow across valve 14, and a down or closed position in the second state of solenoid 12 in which fluid channels 82 on opposite sides of valve 14 are isolated from each other such that the fluid cannot flow across valve 14. Referring to FIG. 3, diaphragm assembly 66 is illustrated in the down or closed position in which fluid channels 82 on opposite sides of valve 14 are isolated from each other such that fluid cannot flow across valve 14.

Continuing to refer to FIG. 3, diaphragm assembly 66 and valve channels 82 are covered by a valve bonnet 64, which is held in stationary position relative to solenoid 12 by bonnet bolts 76. Solenoid 12 is electrically controlled by electrical signals received via electrical inputs 80. Electrical signals received via electrical inputs 80 are used to selectively energize a coil 60, which, when energized, causes plunger assembly 62 to be displaced along its longitudinal axis against the spring tension provided by a plunger spring 78. As illustrated in FIG. 3, coil 60 is energized such that plunger assembly 62 is displaced longitudinally against plunger spring 78 such that diaphragm assembly 66 is in the down or closed position. Plunger assembly 62 is held captured within coil 60 by a plunger tube assembly 72, which is held in place by a top nut 70 and lock washer 68.

Figure 4:
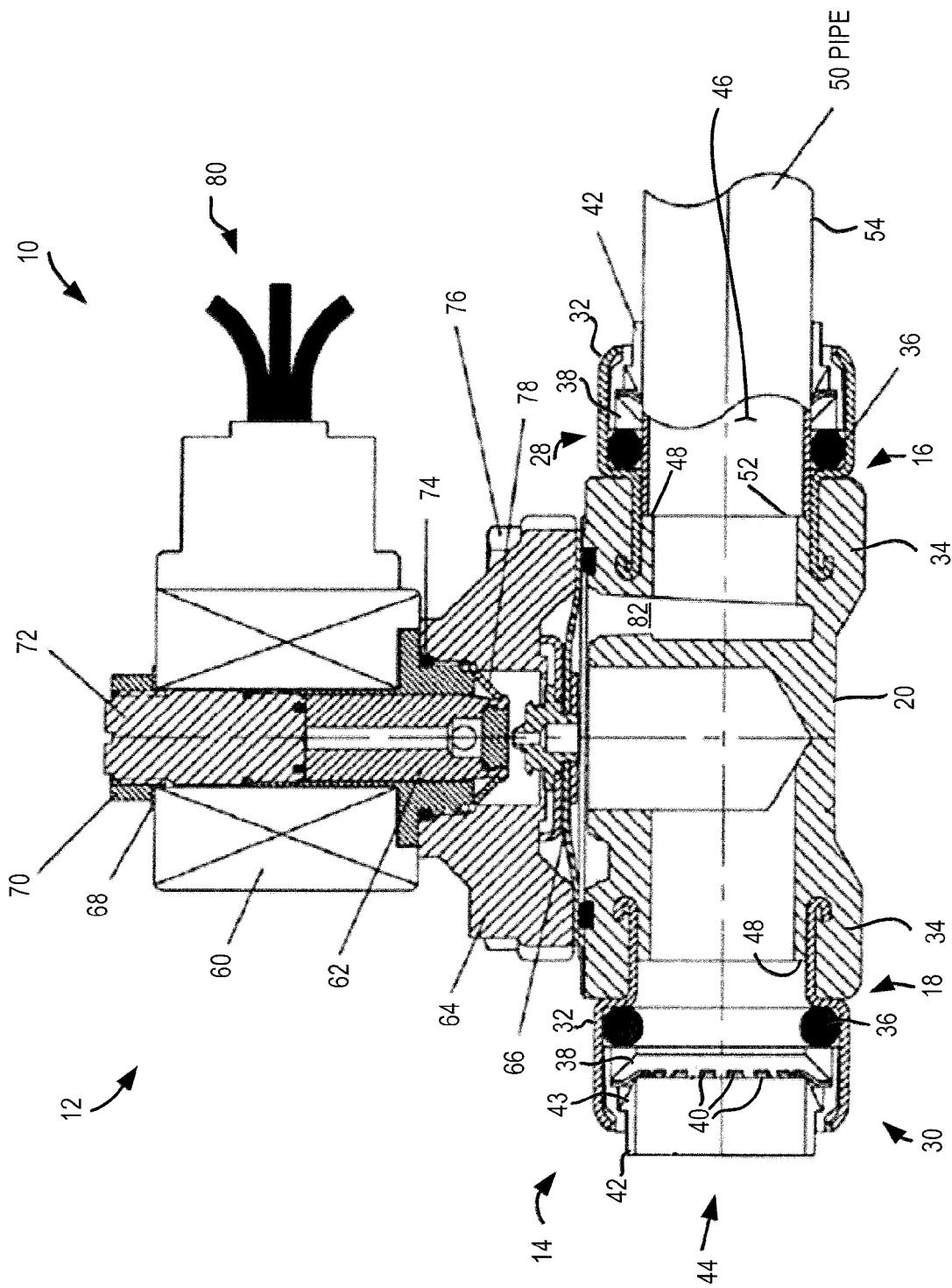
FIG. 4 includes a schematic cross-sectional diagram of a solenoid valve of the type illustrated in FIGS. 1 and 3, according to some exemplary embodiments.

FIG. 4 includes a schematic cross-sectional diagram of a solenoid valve of the type illustrated in FIGS. 1 and 3, according to some exemplary embodiments. FIG. 4 is the same as FIG. 3, except that, in FIG. 4, coil 60 is not energized, such that plunger assembly 62 is not displaced longitudinally against plunger spring 78 such that diaphragm assembly 66 is in the up or open position in which fluid channels 82 on opposite sides of valve 14 are connected to each other such that fluid can flow across valve 14. FIG. 4 includes features of valve 14 illustrated in and described above in connection with FIG. 3. These like features are identified by the same reference numerals as used in FIG. 3. Detailed description of these like features will not be repeated.

Figure 5:
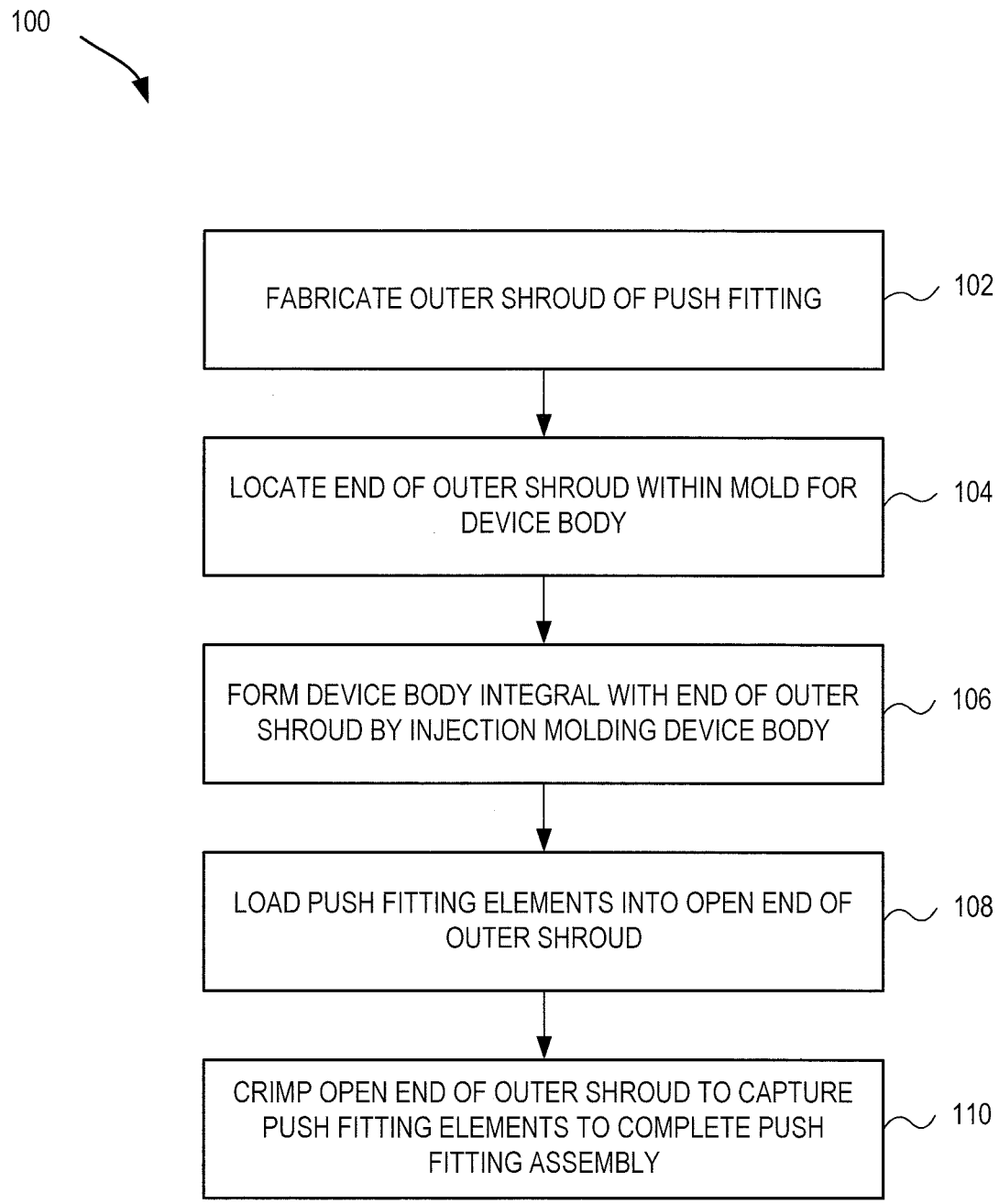
FIG. 5 includes a logical flow diagram of a process for manufacturing a device having a push fitting, according to some exemplary embodiments.

FIG. 5 includes a logical flow diagram of a process for manufacturing a device having a push fitting, according to some exemplary embodiments. In some exemplary embodiments, the device is a valve, and in some particular exemplary embodiments, the device is a solenoid valve, as described above in detail. However, it will be understood that the present disclosure is applicable to any type of device having one or more push fittings. Such devices can be, for example, any device with a plastic housing or body able to be connected into a fluid flow circuit, including, but not limited to, filters, regulators, lubricators, and the like.

Referring to FIG. 5, the method 100 according to the disclosure includes fabricating an outer shroud 32 of push fitting 28, 30, in step 102. As described above, outer shroud 32 can be made of some crimpable or permanently deformable material such as copper or an alloy of copper. As illustrated in step 104, an end of outer shroud 32 is placed or located within a mold used to form the body, e.g., valve body 20, of the device, e.g., valve 14, that includes the push fitting being fabricated. Next, in step 106, the body of the device, e.g., valve body 20 of valve 14, is formed integral with the end of outer shroud 32 loaded into the mold, such as by injection molding the device body using some molding material. In some exemplary embodiments, the material includes nylon. In some exemplary embodiments, the material includes Noryl. Next, in step 108, the push fitting is fabricated by loading the elements of the push fitting, such as O-ring 36, grip ring 38 and collar 42, into the open end of outer shroud 32. Next, in step 110, the push fitting assembly can be completed by crimping the open end of outer shroud 32 to capture the push fitting elements in the outer shroud 32.

Combinations of Features

Various features of the present disclosure have been described above in detail. The disclosure covers any and all combinations of any number of the features described herein, unless the description specifically excludes a combination of features. The following examples illustrate some of the combinations of features contemplated and disclosed herein in accordance with this disclosure.

In any of the device embodiments described in detail and/or claimed herein, the push fitting can be on a valve.

In any of the device embodiments described in detail and/or claimed herein, the push fitting can be on a solenoid valve.

In any of the device embodiments described in detail and/or claimed herein, the push fitting assembly can include a grip ring for gripping a tubular element connectable to the push fitting.

In any of the device embodiments described in detail and/or claimed herein, the tubular element can be a tube.

In any of the device embodiments described in detail and/or claimed herein, the tubular element can be a pipe.

In any of the device embodiments described in detail and/or claimed herein, the grip ring can include a plurality of grip fingers for gripping the tubular element.

In any of the device embodiments described in detail and/or claimed herein, the grip ring can include a metallic material.

In any of the device embodiments described in detail and/or claimed herein, the grip ring can include stainless steel.

In any of the device embodiments described in detail and/or claimed herein, the push fitting assembly can include an O-ring for sealing the push fitting.

In any of the device embodiments described in detail and/or claimed herein, the push fitting assembly can include a sleeve, the sleeve defining a longitudinal opening into which a tubular element may be inserted to connect the tubular element to the push fitting.

In any of the device embodiments described in detail and/or claimed herein, the sleeve can be movable to engage the grip ring to release the tubular element from the push fitting.

In any of the device embodiments described in detail and/or claimed herein, the housing can include a metallic material.

In any of the device embodiments described in detail and/or claimed herein, the housing can include copper.

In any of the device embodiments described in detail and/or claimed herein, the housing can include a copper alloy.

In any of the device embodiments described in detail and/or claimed herein, the body can include a plastic material.

In any of the device embodiments described in detail and/or claimed herein, the body can include a molded plastic material.

In any of the device embodiments described in detail and/or claimed herein, the body can include Noryl.

In any of the device embodiments described in detail and/or claimed herein, the body can include nylon.

In any of the method embodiments described in detail and/or claimed herein, forming the body can include molding the body integrally with the housing.

In any of the method embodiments described in detail and/or claimed herein, forming the body can include injection molding the body integrally with the housing.

In any of the method embodiments described in detail and/or claimed herein, the housing can include a metallic material.

In any of the method embodiments described in detail and/or claimed herein, the housing can include copper.

In any of the method embodiments described in detail and/or claimed herein, the housing can include a copper alloy.

In any of the method embodiments described in detail and/or claimed herein, forming the body can include molding plastic.

In any of the method embodiments described in detail and/or claimed herein, forming the body can include injection molding plastic.

In any of the method embodiments described in detail and/or claimed herein, forming the body can include molding Noryl.

In any of the method embodiments described in detail and/or claimed herein, forming the body can include injection molding Noryl.

In any of the method embodiments described in detail and/or claimed herein, forming the body can include molding nylon.

In any of the method embodiments described in detail and/or claimed herein, forming the body can include injection molding nylon.

In any of the method embodiments described in detail and/or claimed herein, the elements of the push fitting assembly installed inside the housing can include a grip ring for gripping a tubular element connectable to the push fitting.

In any of the method embodiments described in detail and/or claimed herein, the elements of the push fitting assembly installed inside the housing can include an O-ring for sealing the push fitting.

In any of the method embodiments described in detail and/or claimed herein, the elements of the push fitting assembly installed inside the housing can include a sleeve, the sleeve defining a longitudinal opening into which a tubular element may be inserted to connect the tubular element to the push fitting.

In any of the method embodiments described in detail and/or claimed herein, forming the body can include forming a second end of the housing with a crimpable material longitudinally beyond the first end of the body; and the method of making a push fitting can include crimping the crimpable second end of the housing to capture the elements of the push fitting assembly inside the housing.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A method of making a push fitting, comprising:
    forming a body having a longitudinal axis along which a fluid can flow, the body defining an opening at a first end of the body, forming the body comprising: forming a first end of a housing integrally within a wall of the opening at the first end of the body and forming a second end of the housing with a crimpable material longitudinally beyond the first end of the body; and
    installing elements of a push fitting assembly inside the housing.

2. The method of claim 1, wherein forming the body comprises molding the body integrally with the housing.

3. The method of claim 2, wherein forming the body comprises injection molding the body integrally with the housing.

4. The method of claim 1, wherein the housing comprises a metallic material.

5. The method of claim 1, wherein the housing comprises one of copper and a copper alloy.

6. The method of claim 1, wherein forming the body comprises molding one of plastic, Noryl, and nylon.

7. The method of claim 1, wherein forming the body comprises injection molding one of plastic, Noryl, and nylon.

8. The method of claim 1, wherein the elements of the push fitting assembly installed inside the housing include a grip ring for gripping a tubular element connectable to the push fitting.

9. The method of claim 1, wherein the elements of the push fitting assembly installed inside the housing include an O-ring for sealing the push fitting.

10. The method of claim 1, wherein the elements of the push fitting assembly installed inside the housing include a sleeve, the sleeve defining a longitudinal opening into which a tubular element may be inserted to connect the tubular element to the push fitting.

11. The method of claim 1, wherein:
    the method of making a push fitting further comprises crimping the crimpable second end of the housing to capture the elements of the push fitting assembly inside the housing.

12. A method of making a valve, comprising:
    forming a valve body having a longitudinal axis along which a fluid can flow, the valve body defining an opening at a first end of the valve body, forming the valve body comprising: forming a first end of a housing integrally within a wall of the opening at the first end of the valve body and forming a second end of the housing with a crimpable material longitudinally beyond the first end of the body; and
    installing elements of a push fitting assembly inside the housing.

13. The method of claim 12, wherein forming the valve body comprises molding the valve body integrally with the housing.

14. The method of claim 12, wherein forming the valve body comprises injection molding the valve body integrally with the housing.

15. The method of claim 12, wherein the housing comprises a metallic material.

16. The method of claim 15, wherein the metallic material comprises one of copper and a copper alloy.

17. The method of claim 12, wherein forming the valve body comprises molding one of plastic, Noryl, and nylon.

18. The method of claim 12, wherein forming the valve body comprises injection molding one of plastic, Noryl, and nylon.

19. The method of claim 12, wherein the elements of the push fitting assembly installed inside the housing include a grip ring for gripping a tubular element connectable to the valve.

20. The method of claim 12, wherein the elements of the push fitting assembly installed inside the housing include an O-ring for sealing the push fitting assembly.

21. The method of claim 12, wherein the elements of the push fitting assembly installed inside the housing include a sleeve, the sleeve defining a longitudinal opening into which a tubular element may be inserted to connect the tubular element to the valve.

22. The method of claim 12, wherein:
    the method of making a valve further comprises crimping the crimpable second end of the housing to capture the elements of the push fitting assembly inside the housing.

* * * * *